United States Patent [19]
Kiatamura et al.

[11] Patent Number: 5,443,666
[45] Date of Patent: Aug. 22, 1995

[54] ACICULAR FINE PARTICLES CONTAINING METALLIC IRON, IRON CARBIDE AND CARBON, PROCESS THEREOF, AND MAGNETIC COATING COMPOSITION AND MAGNETIC RECORDING MEDIUM CONTAINING THE SAME

[75] Inventors: Ikuo Kiatamura; Takuya Arase; Fumihiro Kamiya; Shigeo Daimon, all of Settsu, Japan

[73] Assignee: Daikin Industries, Ltd., Osaka, Japan

[21] Appl. No.: 117,169

[22] PCT Filed: Nov. 20, 1993

[86] PCT No.: PCT/JP93/00060

§ 371 Date: Sep. 17, 1993

§ 102(e) Date: Sep. 17, 1993

[87] PCT Pub. No.: WO93/14896

PCT Pub. Date: May 8, 1993

[30] Foreign Application Priority Data

Jan. 22, 1992 [JP] Japan .................. 4-034086

[51] Int. Cl.[6] .............................. B22F 1/00; H01F 1/03
[52] U.S. Cl. .................................. 148/513; 252/62.51
[58] Field of Search ............... 148/513; 252/62.51; 428/328

[56] References Cited

U.S. PATENT DOCUMENTS

| | | | |
|---|---|---|---|
| 4,668,414 | 5/1987 | Okamura et al. | 252/62.51 |
| 4,748,080 | 5/1988 | Itozawa | 428/328 |
| 4,794,047 | 12/1988 | Kubota et al. | 428/328 |
| 5,151,206 | 9/1992 | Okamura et al. | 252/62.51 |
| 5,205,950 | 4/1993 | Shibuya et al. | 252/62.51 |

*Primary Examiner*—Donald P. Walsh
*Assistant Examiner*—John N. Greaves
*Attorney, Agent, or Firm*—Nikaido, Marmelstein, Murray & Oram

[57] ABSTRACT

The present invention provides an acicular fine particles obtained by reducing an iron carbide starting material and containing metal iron, iron carbide and free carbon, the acicular fine particles having a mean particle size (long axis) of 0.1 to 0.5 μm and an average axial ratio of 3 to 15 and containing 15 to 80 wt. % of metal iron, 10 to 75 wt. % of iron carbide and 5 to 13 wt. % of free carbon, process thereof, magnetic coating composition and magnetic recording medium containing the same.

16 Claims, 2 Drawing Sheets

ACICULAR FINE PARTICLES CONTAINING METALLIC IRON, IRON CARBIDE AND CARBON, PROCESS THEREOF, AND MAGNETIC COATING COMPOSITION AND MAGNETIC RECORDING MEDIUM CONTAINING THE SAME

TECHNICAL FIELD

The present invention relates to acicular fine particles containing metal iron, iron carbide and free carbon. More particularly the invention relates to acicular fine particles having magnetic characteristics effectively usable for metal tapes for use in audio cassette recorders, a process for preparing the same, and a magnetic coating composition and magnetic recording medium which contain such particles.

BACKGROUND ART

Magnetic powders usable in metal tapes for audio cassette recorders need to have such magnetic characteristics that they are about 1000 to about 1300 Oe in coercive force (Hc) so as to conform to the metal tape selector position.

Conventional magnetic powders include a metal iron magnetic powder which is termed metal magnetic powder and obtained by reducing an iron oxide with hydrogen. The powder generally has a coercive force higher than the above value and is therefore not usable as it is for audio metal tapes. Accordingly, the powder is made larger in particle size, for example, at least 0.5 μm in the length of long axis so as to exhibit a coercive force within the above range. However, the powder of relatively large particle sizes has the drawback that the tape prepared with use of the powder is rough-surfaced and is great in spacing loss and noise, failing to satisfactorily deliver the input signal. As an alternative measure, it has been practice to add Ni powder or Co to the metal iron magnetic powder, but the material then has the drawback of being costly because of the production step and the material additionally needed.

A metal iron magnetic powder prepared from iron carbide and having a high coercive force is described in Japanese Patent Application No. 126291/1990, which nevertheless mentions nothing about such a powder which is 1000 to 1300 Oe in coercive force. Although a comparative example given in the same application affords an Fe/Fe$_5$C$_2$ composition obtained by an interrupted reduction reaction, the composition is poor in SFD (Switching Field Distribution) characteristics.

Magnetic powders in which metal iron, iron carbide and free carbon can be present are disclosed in prior-art literature such as JP-A-211625/1985, JP-A-212821/1985, JP-A-196502/1986 and U.S. Pat. No. 4,794,042.

JP-A-211625/1985 and JP-A-212821/1985, which are different from the present invention in object, disclose mixtures of two different kinds of primary magnetic particles. The former provides a mixture of metal magnetic particles and metal carbide magnetic particles, while the latter provides a mixture of metal magnetic particles and magnetic metal particles having a coating of iron carbide over the metal surface. These mixtures differ from the acicular fine particles of the present invention in that the material of the invention contains iron carbide, metal iron and carbon within primary particles. The present invention employs a different production process in that the material is obtained by the reduction of iron carbide. JP-A-196502/1986 relates to magnetic particles containing iron carbide and much smaller proportion of iron oxide and carbon as by-products than had previously been prepared by improving a known process for preparing iron carbide. The particles of this publication have a lower carbon content than the fine particles of this invention, are therefore different in this respect and also differ from the fine particles of the invention in magnetic characteristics. The production process of the invention is intended to cause a predetermined amount of metal iron to be present in the particles, and is different from that of this publication. U.S. Pat. No. 4,794,042 discloses a magnetic recording medium containing iron carbide and iron oxide, or a magnetic recording medium further containing metal iron. The powder of this patent has FenC at least in the surface layer and contains α-Fe in the central portion. With FenC present in the surface layer, the powder has the drawback of being low in dispersibility in coating compositions. Furthermore, the powder is obtained by a rapid reaction, which therefore encounters difficulty in giving the powder a coercive force within the desired range.

An object of the present invention is to provide acicular fine particles which are suitable in magnetic characteristics for use in audio metal tapes and which are decreased in particle size to afford tapes of reduced surface roughness and lower noise level.

Another object of the invention is to provide a process for preparing such acicular fine particles, and a magnetic coating composition and magnetic recording medium containing such acicular fine particles.

The present invention provides acicular fine particles obtained by reducing a material comprising iron carbide containing and containing metal iron, and free carbon, the acicular fine particles having a mean particle size (long axis) of 0.1 to 0.5 μm and an average axial ratio of 3 to 15 and containing 15 to 80 wt. % of metal iron, 10 to 75 wt. % of iron carbide and 5 to 13 wt. % of free carbon, a process for preparing the particles, and a magnetic coating composition and magnetic recording medium containing such particles.

The present invention is based on the finding that when iron carbide is reduced, the reducing reaction is controllable suitably by using a very small amount, within a specified range, of a reduction control agent admixed with hydrogen gas, serving as a reducing gas, to give acicular fine particles having the foregoing characteristics or composition.

The reduction control agent for use in the present invention means an agent capable of controlling the velocity of reduction of iron carbide with hydrogen. Examples of such agents are carbon-containing compounds with one or two carbon atoms, and are more specifically carbon monoxide (CO), carbon dioxide (CO$_2$), methane, methanol, ethanol, formic acid, methyl formate, etc., among which CO and CO$_2$ are preferable. CO is especially preferable.

The reason still remains to be clarified why acicular fine particles of the present invention can be obtained effectively by reducing iron carbide with hydrogen containing a very small amount of reduction control agent. However, the reason appears to be as follows. When the reduction control agent is not present in the reducing gas, the reduction of iron carbide proceeds rapidly, readily giving acicular fine particles having a high proportion of metal iron owing to difficulty encountered in controlling the composition of the fine particles, whereas in the case where the reduction control agent is present in the reducing gas, the reducing reaction is inhibited for one reason or another and takes place at a low velocity, consequently making it easy to control the proportion of metal iron in acicular fine particles. Further because the reducing reaction is effected at a suppressed velocity, individual particles will presumably be less susceptible to temperature variations due to the heat of reaction and the attendant deformation.

The acicular fine particles of the present invention containing metal iron, iron carbide and free carbon can be obtained by bringing a gas mixture of hydrogen and reduction control agent into contact with an iron carbide material in the form of acicular fine particles. The preferred contact temperature is about 300° to about 400° C. The preferred contact time varies with the amount of material to be treated, treating conditions and composition of fine particles of the invention to be desired, and is about 0.2 to about 6 hours. When required, a diluting agent such as $N_2$, Ar or He is usable. The diluting ratio can be determined as desired, and may be, for example, 1.1 to 10 times the amount (by volume) of the gas mixture. The preferred rate of flow of the gas mixture other than the diluting agent is about 1 to 1000 ml S.T.P./min per gram of the acicular iron carbide material. Although not limited specifically, the contact pressure of the gas mixture inclusive of the diluting agent is usually 1 to 2 atm.

The gas mixture of hydrogen and reduction control agent for use in the reduction of the present invention comprises a very large amount of hydrogen and a very small amount of reduction control agent. The ratio of hydrogen to reduction control agent by volume is preferably 1:0.004 to 1:0.0005, more preferably 1:0.0025 to 1:0.0005, most preferably 1:0.002 to 1:0.0007. If the proportion of reduction control agent exceeds the above range, the reducing reaction slows down or fails to proceed, whereas when the proportion is smaller than the above range, the agent produces no effect. The reaction control agent present and the hydrocarbon produced by the reduction of iron carbide can be separated out as free carbon on the surface of metal iron or iron carbide depending on the conditions involved.

The acicular fine particulate iron carbide to be used as the starting material in the process for preparing acicular fine particles of the invention can be a known iron carbide. Examples of such iron carbides are acicular fine particulate iron carbide disclosed, for example, in JP-A-22000/1975, JP-A-84179/1977, JP-A-29035/1979, JP-A-71509/1985, JP-A-111921/1986, etc. The iron carbide obtained by preparing reduced iron and thereafter carbonizing the iron is liable to deform because the water formed in the reduction changes a shape of the reduced iron. The fine particulate iron carbides to be used as the starting material are $Fe_5C_2$, $Fe_7C_3$, FeC and $Fe_3C$, among which the former three are desirable.

The acicular fine partculate iron carbide to be used as the starting material in the present invention is prepared, for example, (a) by contacting or not contacting a reducing agent containing no carbon atom with an acicular iron oxyhydroxide or acicular iron oxide, and (b) contacting a reducing agent containing carbon atom or a mixture thereof with a reducing agent containing no carbon atom with the iron compound of the above (a).

In the above, examples of preferred acicular iron oxyhydroxides are acicular $\alpha$-FeOOH (goethite), acicular $\beta$-FeOOH (akaganite) and acicular $\tau$-FeOOH (lepidocrosite), and preferred acicular iron oxides are acicular $\alpha$-Fe$_2$O$_3$ (hematite), acicular $\tau$-Fe$_2$O$_3$ (maghemite) and acicular Fe$_3$O$_4$ (magnetite).

Acicular $\alpha$-Fe$_2$O$_3$ or acicular $\tau$-Fe$_2$O$_3$ is, for example, any of one prepared by heating acicular $\alpha$-FeOOH, acicular $\beta$-FeOOH or acicular $\tau$-FeOOH at about 200° to about 350° C., followed by dehydration, acicular $\alpha$-Fe$_2$O$_3$ or acicular $\tau$-Fe$_2$O$_3$ prepared by heating the resulting product further at about 350° to about 900° C. to compact the crystals, and others.

The acicular iron oxyhydroxides or acicular iron oxides can be those usually at least 3, preferably 5 to 15, in average axial ratio and having an average particle size (long axis) of usually up to 0.5 μm, preferably 0.1 to 0.5 μm. The acicular iron carbide fine particles produced are slightly smaller than, but almost unchanged from, the starting material in average axial ratio and in average particle size.

The starting material to be used for the process for producing acicular iron carbide fine particles may be added thereto a small amount or small amounts of a compound, such as oxide or carbonate of copper, magnesium, manganese or nickel; oxide, potassium salt or sodium salt of silicon, insofar as the starting material is acicular and chiefly comprises an iron oxyhydroxide or iron oxide.

Acicular iron oxyhydroxide or iron oxide can be coated with a cobalt compound, for example, by dispersing the iron compound in an aqueous solution of a cobalt salt (eg, dilute solution of 0.1 to 10% by weight) with stirring at room temperature or with heating, render the dispersion to alkaline with addition of an aqueous solution of an alkaline compound, stirring for 30 minutes to 1 hour when required, filtering and drying the dispersion.

The starting iron compound can be used as coated with a sintering-preventing agent as disclosed in JP-A-60-141611. Examples of useful agents are silicon(e) compound, boron compound, aluminum compound, aliphatic carboxylic acid or salt thereof, phosphorus compound, titanium compound, etc.

The processes (a) and (b) for producing acicular iron carbide fine particles which is a starting compound of the present invention, and the reducing agents used therein, etc. are described in detail in JP-A-61-106408.

Particularly preferable examples of the reducing agent containing no carbon atom are H$_2$ and NH$_2$NH$_2$. Particularly preferable reducing agent containing carbon atom are CO, CH$_3$OH, HCOOCH$_3$, saturated or unsaturated aliphatic hydrocarbons having 1 to 5 carbon atoms.

In the process (a) of the above, the reducing agent containing no carbon atom can be used as it is or as diluted. Examples of diluents are N$_2$, argon, helium, etc. The dilution ratio is suitably selected but is preferably about 1.1 to about 10 times (by volume). The contact temperature, contact time, gas flow rate and other conditions depend, for example, on the production history, average axial ratio, average particle size, specific surface area of the acicular iron oxyhydroxide or acicular iron oxide and a desired characteristics of the product. The preferred contact temperature is about 200° to about 700° C., preferably about 300° to about 400° C. The preferred contact time is about 0.5 to about 6 hours. The preferred gas flow rate (excluding diluent) is about 1 to about 1000 ml S.T.P./min, more preferably about 5 to about 500 ml S.T.P./min, per gram of the starting material. The contact pressure inclusive of that of the diluent is usually 1 to 2 atm. although not limitative particularly.

In the process (b) of the above, the reducing agent containing carbon atom or a mixture thereof with the reducing agent containing no carbon atom can be used as it is or as diluted. When the mixture is used, the mixing ratio of the reducing agent containing carbon atom and the reducing agent containing no carbon atom is suitably selected but is preferably 1/0.05 to 1/5 by volume. Contact conditions are also suitably selected but the preferred contact temperature is about 250° to about 400° C., more preferably about 300° to about 400° C. The preferred contact time is about 0.5 to 6 hours when the contact in (a) is conducted, and about 1 to about 12 hours when the contact in (a) is not conducted. The preferred gas flow rate (excluding diluent) is about 1 to about 1000 ml S.T.P./min, more preferably about 5 to about 500 ml S.T.P./ml, per gram of the starting iron compound. The contact pressure inclusive of that of the diluent is usually 1 to 2 atm. although not limitative particularly.

The product thus obtained is suitable as a starting material iron carbide for use in the invention. Although the material consists primarily of an iron carbide, free carbon and iron oxide can be present therein. Suitable iron carbide materials for use in the present invention should contain at least 20%, preferably at least 50%, more preferably at least 60%, of iron carbide, which is predominantly $Fe_5C_2$, while $Fe_7C_3$, $FeC$ and $Fe_3C$ can be present. These iron carbides are examples of starting material iron carbides already mentioned.

The acicular fine particles of the present invention contain 15 to 80 wt. % of metal iron, 10 to 75 wt. % of iron carbide and 5 to 13 wt. % of free carbon. When containing 15% of metal iron, the fine particles have a coercive force Hc of about 1000 Oe. The carbon content of the acicular fine particles of the present invention can be determined only by elementary analysis, and no carbon or no graphite is detectable using X-rays. It is speculated that the carbon can be amorphous, but details still remain unknown. The carbon content determined by elementary analysis is the total carbon content which is the sum of the carbon content of the iron carbide (7.92% calculated for $Fe_5C_2$) and free carbon content. The acicular fine particles of the invention are 3 to 15 in average axial ratio and has a mean particle size (long axis) which is 0.1 to 0.5 μm to be suitable.

The acicular fine particles of the present invention contain free carbon or iron carbide in addition to metal iron, and are therefore relatively higher than the conventional metal magnetic powder in corrosion resistance. Further, the fine particles of the invention are relatively superior to those having an iron carbide surface in the characteristics of dispersibility in coating compositions. Accordingly, even when made into sheets, the acicular fine particulate material of the invention retains stabilized magnetic characteristics over a prolonged period of time. Because of the feature that the present material has the specified magnetic characteristics and a small particles size, the material is usable also as a magnetic powder for VTR tapes.

The magnetic coating composition of the present invention can be prepared by dispersing the above acicular fine particles of the present invention in an organic solvent together with a binder. To the composition are added, as required, a dispersing agent, lubricant, abrasive, antistatic agent and like additives.

Hitherto known thermoplastic resins, thermosetting resins, reaction-type resins, or mixtures thereof, can be used as binders in the present invention.

Suitable thermoplastic resins are those which have a softening point of about 150° C. or less, an average molecular weight of about 10,000 to 200,000, and a degree of polymerization of about 200 to 2,000, e.g., a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a polyvinyl fluoride, a vinylidene chloride-acrylonitrile copolymer, a butadiene-acrylonitrile copolymer, a polyamide resin, polyvinyl butyral, cellulose derivatives such as cellulose acetate butyrate, cellulose diacetate, cellulose triacetate, cellulose propionate, cellulose nitrate, and the like, a styrene-butadiene copolymer, a polyester resin, a chlorovinyl ether-acrylate copolymer, an amino resin, various synthetic rubber based thermoplastic resins and mixtures thereof.

Suitable thermosetting resins or reaction-type resins have a molecular weight of about 200,000 or less as a coating solution, and when heated after coating and drying, the molecular weight becomes infinite due to reactions such as condensation, addition, and the like. Of these resins, preferred resins are those resins which do not soften or melt before the resin thermally decomposes. Representative examples of these resins are a phenol resin, an epoxy resin, a polyurethane hardening type resin, a urea resin, a melamine resin, an alkyd resin, a silicone resin, an acryl based reactive resin, an epoxy-polyamide resin, a mixture of a high molecular weight polyester resin and an isocyanate prepolymer, a mixture of a methacrylic acid copolymer and a diisocyanate-prepolymer, a mixture of a polyester-polyol and a polyisocyanate, a urea-formaldehyde resin, a mixture of a low molecular weight glycol, a high molecular weight diol and triphenylmethane triisocyanate, a polyamine resin, and mixtures thereof, etc.

These binders can be used singly or in mixture, and the additives can be added to the binders. The binders are used in an amount of preferably 10 to 400 parts by weight, more preferably 30 to 200 parts by weight per 100 parts by weight of the acicular particles.

The organic solvents include ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate and glycol monoethyl ether acetate; ethers such as ether, glycol dimethyl ether, glycol monoethyl ether and dioxane; tars (aromatic hydrocarbons) such as benzene, toluene and xylene; chlorinated hydrocarbons such as methylene chloride, ethylene chloride, carbon tetrachloride, chloroform, ethylene chlorohydrin and dichlorobenzene; and the like.

The dispersing agents used include aliphatic acids having 12 to 18 carbon atoms ($R^1COOH$ wherein $R^1$ is an alkyl group having 11 to 17 carbon atoms) such as caprylic acid, capric acid, lauric acid, myristic acid, palmitic acid, stearic acid, oleic acid, elaidic acid, linolic acid, linolenic acid and stearolic acid; metal soaps comprising an alkali metal (such as Li, Na and K) or an alkaline earth metal (such as Mg, Ca and Ba) salt of the above aliphatic acids; lecithin, etc. In addition, higher alcohols having 12 or more carbon atoms and sulfuric esters can be used. These dispersing agents are added in an amount of 1 to 20 parts by weight per 100 parts by weight of the binder.

The lubricants used include silicone oil, graphite, molybdenum disulfide, tungsten disulfide, aliphaticesters obtained from monobasic aliphatic acids having 12 to 16 carbon atoms and monohydric alcohols having 3 to 12 carbon atoms, aliphatic esters obtained from monobasic aliphatic acids having 17 or more carbon atoms and monohydric alcohols (a total of the carbon atoms of the monobasic aliphatic acid and the carbon atoms of the monohydric alcohol are 21 to 23), etc. These lubricants are added in an amount of 0.2 to 20 parts by weight per 100 parts by weight of the binder.

The abrasives used include those which are generally used, such as fused alumina, silicon carbide, chromium oxide, corundum, artificial corundum, diamond, artificial diamond, garnet and emery (main components: corundum and magnetite). The average particle diameter of these abrasives is 0.05 to 5 µm, preferably 0.1 to 2 µm. These abrasives are added in an amount of 7 to 20 parts by weight per 100 parts by weight of the binder.

Examples of the antistatic agents are natural surfactants such as saponin, nonionic surfactants such as alkylene oxide-base, glycerin-base or glycidol-base surfactant; cationic surfactants such as higher alkylamines, quaternary ammonium salts, pyridine and like heterocyclic compounds, phosphonium or sulfonium compounds; anionic surfactants such as those containing a carboxylic acid, sulfonic acid, phosphoric acid, sulfate group or phosphate group and like acid group; ampholytic surfactants such as amino acids, amino sulfonic acid, sulfate or phosphate of aminoalcohol, etc. These antistatic agent can be used singly or in mixture. Although the above compounds are used as antistatic agents, the compounds can be used in some cases, to improve the dispersibility, magnetic characteristics, lubricability or coating ability. These antistatic agents are added in an amount of 1 to 2 parts by weight per 100 parts by weight of the binder.

The magnetic recording medium of the present invention are obtained by coating the above magnetic coating composition on a substrate (support).

The thickness of the support is about 5 to 50 µm, preferably about 10 to 40 µm. The materials used for the support include polyesters such as polyethylene terephthalate and polyethtylene-2,6-naphthalate, polyolefins such as polypropylene, cellulose derivatives such as cellulose triacetate and cellulose diacetate, polycarbonate, and the like.

For preventing static discharge or preventing transfer printing, the above supports may have a back coat on the surface opposite the surface provided with the magnetic layer.

The supports may be in any shape such as a tape, sheet, card, disc or drum, and various materials can be used depending upon the shape desired and end use contemplated.

The magnetic coating composition can be applied on the support by various conventional methods including air doctor coating, blade coating, air knife coating, squeeze coating, impregnation coating, reverse roll coating, transfer roll coating, gravure coating, kiss coating, cast coating and spray coating. Other coating methods can also be used.

The magnetic layer formed on the support by the above method is dried after, if desired, the coating has been subjected to a treatment for orienting the magnetic powder in the layer. If required, the magnetic layer can be subjected to a surface smoothening treatment, or cut to the desired shape, to thereby form the magnetic recording material of this invention. In the above orienting treatment for the magnetic layer, the orienting magnetic field can be either an AC or DC magnetic field with a field strength of about 500 to 5,000 gauss. The drying temperature can range from about 50° to about 100° C., and the drying time is about 3 to 10 minutes.

BEST MODE FOR CARRYING OUT THE INVENTION

Figure 1:
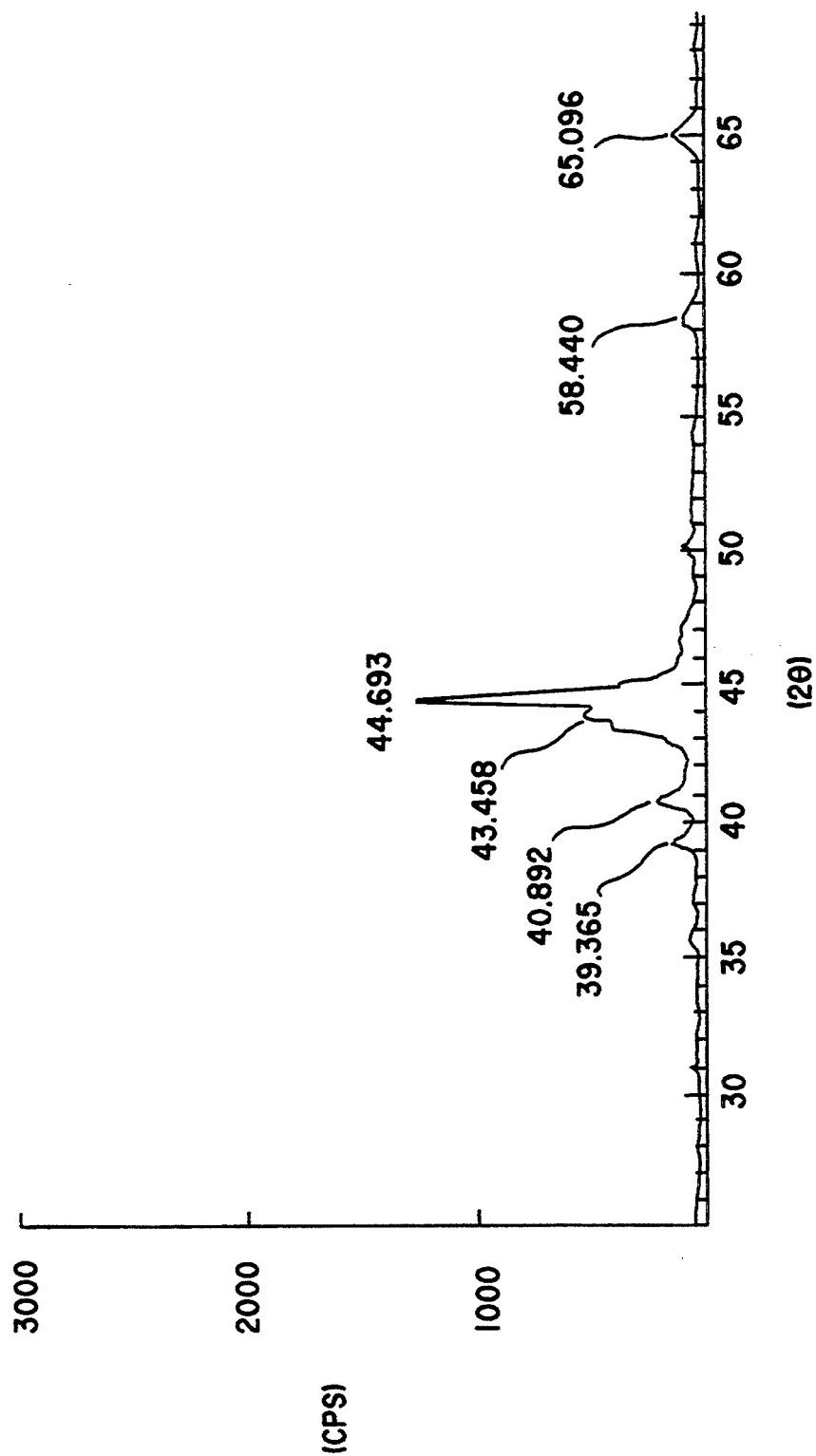
FIG. 1 is an X ray diffraction pattern of a magnetic powder obtained in Example 1.
Figure 2:
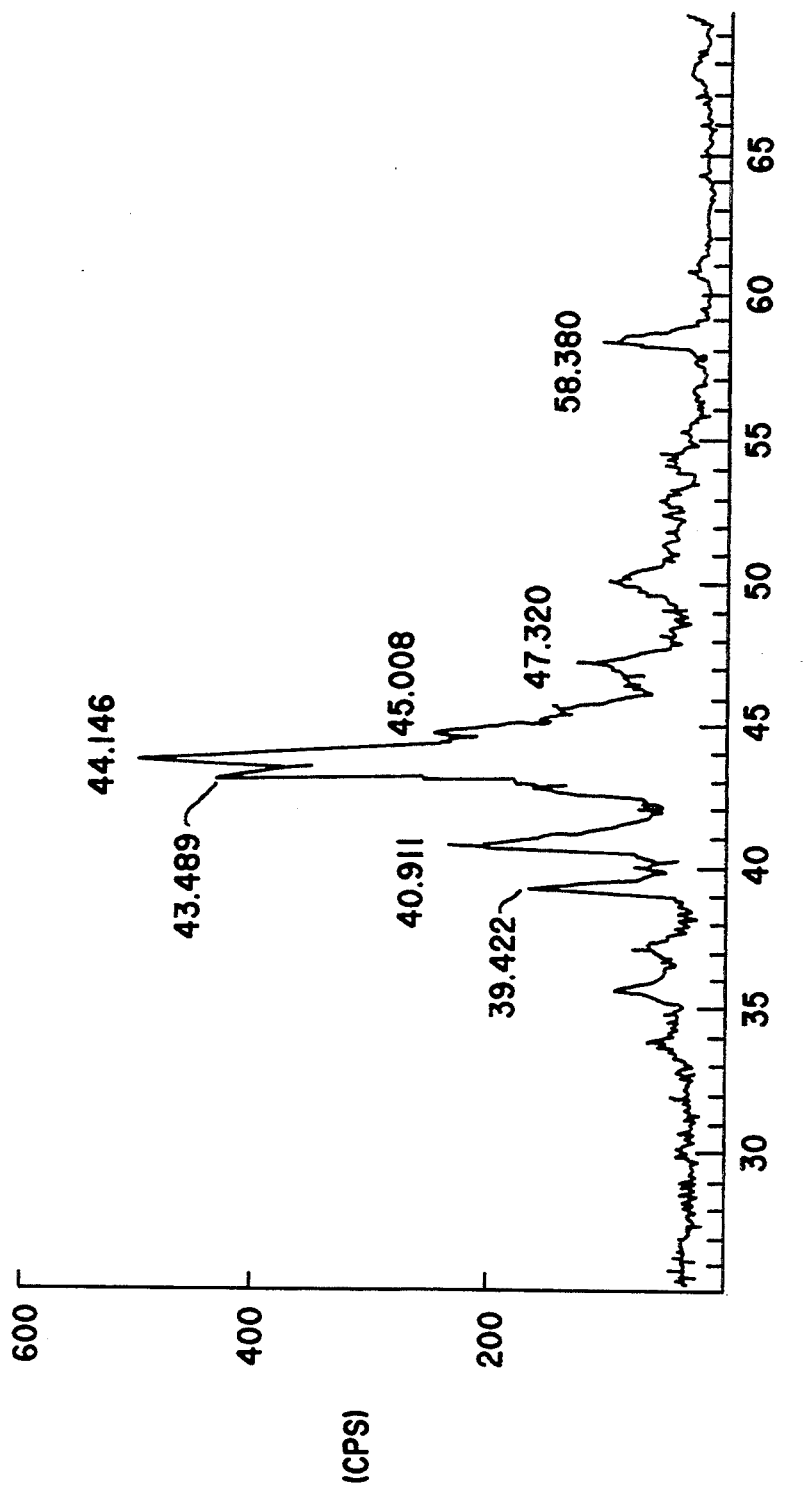
FIG. 2 is an X ray diffraction pattern of a magnetic powder obtained in Comparative Example 5.

The invention will be described below in detail by showing examples and comparative examples.

In the following examples, characteristic, etc. are determined by the methods given below.

(1) Magnetic Characteristics

Using a magnetic characteristics measuring device of the sample-vibrating type, the sample was tested in a magnetic field with a strength of 10 kOe (for powder sample) and 5 kOe (for sheet sample) for coercive force (Hc, Oe), saturation magnetization ($\sigma s$, e.m.u./g) and square ratio (Sq).

(2) SFD (Switching Field Distribution)

SFD was determined by preparing a differentiation curve of coercive force with use of the differentiation circuit of the above device for a sheetlike test piece, measuring the half-value width of the curve and dividing the measured value by the peak value of coercive force of the curve.

(3) Elementary Analysis for C, H and N

The sample is subjected to elementary analysis in the conventional method using MT2 CHN CORDER Yanaco, product of Yanagimoto Mfg. Co., Ltd, with passage of oxygen (helium carrier) at 900° C.

(4) Corrosion Resitance

The sample was allowed to stand in air at 100° C. for 8 hours, and the resulting reduction in the amount of magnetization ($\sigma s$) was calculated as the corrosion resistance (%), $$\text{Corrosion resistance } (\%) = (1 - B/A) \times 100$$

where A and B are the amounts of magnetization ($\sigma s$) of the sample before and after the standing, respectively. The higher the value, the greater is $\sigma s$ deterioration and therefore the lower is the corrosion resistance.

(5) Proportion of Metal Iron in Acicular Fine Particles of the Invention b 1) The total carbon contents of acicular fine particles of the invention, iron carbide starting material and fine metal particles obtained by the process of Comparative Example 1 were determined by elementary analysis.
 2) The amounts of magnetization of the two kinds of particles and the starting material were measured.
 3) The proportion $\alpha$ of metal iron was calculated from the following equation.

$$a = \{100 \ y_1 - 303 \times B \times (100 - x_1)/279\}/(A - 303 \times B/279)$$

$$A = 100 \times y_3/100 - x_3$$

$$B = 27900 \times y_2 / \{303 \times (100 - x_2)\}$$

$x_1$: total carbon content (%) of acicular fine particles of the invention $x_2$: total carbon content (%) of iron carbide starting material $x_3$: total carbon content (%) of fine metal particles obtained by the process of Comparative Example 1

$y_1$: Amount of magnetization (emu/g) of acicular fine particles of the invention $y_2$: Amount of magnetization (emu/g) of iron carbide starting material $y_2$: Amount of magnetization (emu/g) of fine metal particles obtained by the process of Comparative Example 1

EXAMPLE 1

(Preparation of Starting Material Iron Carbide)

In 194 l of water was dispersed 6 kg of acicular goethite particles, 0.4 μm in average particle size (long axis) and 10 in average axial ratio. After adding a small amount of an alkaline solution (20% NaOH solution) to the dispersion to adjust pH more than 13, 1 kg of water glass No.3 ($Na_2O \cdot 3SiO_2$) [about 2.6% of Si based on the weight of $\alpha$-FeOOH] was added to the solution with stirring. To the aqueous solution was added 1N- HCl to adjust the pH to 5. After one hour, the dispersion was filtered and dried. The powder obtained was placed into a muffle furnace and heated at 600° C. for 1 hour to prepare an $\alpha$-$Fe_2O_3$ powder.

A 3 kg quantity of the $\alpha$-$Fe_2O_3$ powder was charged into a reaction tube. The powder was treated at 365° C. for 8 hours while passing CO through the tube at a flow rate of 90 l/min., and then the CO gas was replaced by nitrogen. After cooling the powder nearly to room temperature, the nitrogen was gradually replaced by air to obtain an iron carbide powder.

The X-ray (Cu $K\alpha$ source) diffraction pattern of the product was accorded with $Fe_5C_2$ on ASTM X-Ray Powder Data File 20-509.

(Preparation of Acicular Fine Particles)

A 40 g quantity of the powder obtained was charged into a reaction tube. The powder was treated at 320° C. for 0.5 hour while passing a gas mixture of hydrogen and CO (10000:10 in volume ratio) through the tube at a flow rate of 5 liters/min., followed by replacement of the gas mixture by nitrogen. After the powder was cooled nearly to room temperature, the nitrogen was gradually replaced by air to obtain a powder of the present invention. The X-ray diffraction pattern (FIG. 1) of the product accorded with the composite peaks of $\alpha$-Fe and $Fe_5C_2$ on ASTM X-Ray Powder Data File 6-696 and 20-509, respectively. The powder was confirmed to maintain a good acicular shape by a transmission electron microscope. When examined for magnetic properties, the powder of the present invention was 1108 Oe in coersive force (Hc) and 117.5 emu/g in saturation magnetization ($\sigma s$). The powder was 11.5% in total carbon content and 56.4 $m^2$/g in BET specific surface area as determined by nitrogen adsorption method.

(Preparation of Magnetic Coating Composition and Magnetic Recording Medium)

In 60 g of a solvent were mixed and dispersed 20 g of the powder and 5 g of polyvinyl chloride-acetate resin to prepare a magnetic coating composition. The composition was applied to a polyethylene terephthalate (PET) film to about 5 μ thickness (when dried) in an orientation magnetic field to obtain a magnetic sheet. The sheet was 1093 Oe in Hc, 3640 G in saturation flux density and 0.83 in square ratio.

EXAMPLES 2 TO 5

In each of these examples, acicular fine particles, a magnetic coating composition and magnetic recording medium were prepared in the same manner as in Example 1 except that the reaction was conducted under the conditions listed in Table 1. Table 1 also shows the results.

COMPARATIVE EXAMPLE 1

For comparison, the iron carbide powder used in the foregoing examples was treated with $H_2$ alone at a flow rate of 5 liters/min at 320° C. for 2 hours, whereby a metal powder ($\alpha$-Fe) of high coercive force was obtained.

COMPARATIVE EXAMPLE 2

The procedure of Comparative Example 1 was repeated with the $H_2$ gas contact time reduced to 10 minutes, whereby a composite product of $\alpha$-Fe and $Fe_5C_2$ was obtained. The product was found impaired in SFD and square ratio.

COMPARATIVE EXAMPLE 3

The procedure of Comparative Example 2 was repeated with the $H_2$ gas contact time increased to 20 minutes. The treatment achieved an improvement only in coercive force but no improvement in SFD or square ratio.

COMPARATIVE EXAMPLE 4

The procedure of Comparative Example 2 was repeated with the contact temperature elevated to 350° C. for a longer reaction time. The product exhibited characteristics intermediate between those of the products of Comparative Examples 1 and 2. The SFD was not suitable.

COMPARATIVE EXAMPLE 5

The procedure of Comparative Example 4 was repeated with the reducing gas replaced by a gas mixture of $H_2$/CO (10000/45) for a reaction time of 30 minutes. From the X-ray diffraction of the product, it could not confirm the peak of $\alpha$-Fe.

COMPARATIVE EXAMPLE 6

The procedure of Comparative Example 4 was repeated with the reducing gas replaced by a gas mixture of $H_2$/CO (10000/100) to find that the iron carbide underwent no reduction.

Tables 1 and 2 shows the results of Examples and Comparative Examples.

TABLE 1

| | Example | | | | |
|---|---|---|---|---|---|
| | 1 | 2 | 3 | 4 | 5 |
| size of starting material | 0.4 μm | 0.4 μm | 0.4 μm | 0.5 μm | 0.4 μm |
| first step reaction | | | | | |
| gas | CO | CO | CO | CO | CO |
| temperature (°C.) | 365 | 365 | 365 | 365 | 365 |
| time (hr) | 5 | 5 | 5 | 5 | 5 |
| product in the first step reaction | $Fe_5C_2$ | $Fe_5C_2$ | $Fe_5C_2$ | $Fe_5C_2$ | $Fe_5C_2$ |
| second step reaction | | | | | |
| gas ratio $H_2$/CO(vol) | 10000/10 | 10000/10 | 10000/10 | 10000/10 | 10000/10 |
| temperature (°C.) | 320 | 320 | 370 | 320 | 320 |
| time (hr) | 0.5 | 0.6 | 0.5 | 0.5 | 0.5 |
| product | $\alpha$-Fe/$Fe_5C_2$ | $\alpha$-Fe/$Fe_5C_2$ | $\alpha$-Fe/$Fe_5C_2$ | $\alpha$-Fe/$Fe_5C_2$ | $\alpha$-Fe/$Fe_5C_2$ |
| powder characteristics | | | | | |
| Hc (Oe) | 1108 | 1187 | 1298 | 1075 | 1195 |
| saturation magnetization (emu/g) | 117.5 | 129.1 | 150.0 | 119.2 | 130.5 |
| corrosion resistance (%) | 15 | 14 | 16 | 15 | 15 |
| Composition | | | | | |
| $\alpha$-Fe (%) | 30.9 | 47.7 | 77.7 | 33.3 | 48.0 |
| $Fe_5C_2$ (%) | 62.6 | 45.6 | 12.6 | 60.1 | 45.2 |
| free carbon (%) | 6.5 | 7.3 | 9.7 | 6.6 | 6.8 |
| sheet characteristics | | | | | |
| Hc (Oe) | 1093 | 1186 | 1298 | 1003 | 1190 |
| saturation flux density (G) | 3640 | 3870 | 4630 | 3760 | 3910 |
| square ratio | 0.83 | 0.84 | 0.85 | 0.84 | 0.86 |
| SFD | 0.58 | 0.52 | 0.51 | 0.53 | 0.51 |

TABLE 2

| | Comparative Example | | | | | |
|---|---|---|---|---|---|---|
| | 1 | 2 | 3 | 4 | 5 | 6 |
| size of starting material | 0.4 μm | 0.3 μm | 0.3 μm | 0.3 μm | 0.4 μm | 0.3 μm |
| first step reaction | | | | | | |
| gas | CO | CO | CO | CO | CO | CO |
| temperature (°C.) | 365 | 365 | 365 | 365 | 365 | 365 |
| time (hr) | 5 | 5 | 5 | 5 | 5 | 5 |
| product in the first step reaction | $Fe_5C_2$ | $Fe_5C_2$ | $Fe_5C_2$ | $Fe_5C_2$ | $Fe_5C_2$ | $Fe_5C_2$ |
| second step reaction | | | | | | |
| gas ratio $H_2$/CO(vol) | $H_2$ | $H_2$ | $H_2$ | $H_2$ | $H_2$/CO = 10000/45 | $H_2$/CO = 10000/100 |
| temperature (°C.) | 320 | 320 | 320 | 350 | 350 | 350 |
| time | 2 hr | 10 min | 20 min | 20 min | 30 min | 20 min |
| product | $\alpha$-Fe | $\alpha$-Fe/$Fe_5C_2$ | $\alpha$-Fe/$Fe_5C_2$ | $\alpha$-Fe/$Fe_5C_2$ | $Fe_5C_2$ | $Fe_5C_2$ |
| powder characteristics | | | | | | |
| Hc (Oe) | 1540 | 990 | 1015 | 1300 | 941 | — |
| saturation magnetization (emu/g) | 158 | 105 | 112 | 150 | 96.8 | — |
| corrosion resistance (%) | 18 | — | — | — | — | — |
| Composition | | | | | | |
| $\alpha$-Fe (%) | 89 | 16 | 25 | 79 | 6 | 0.1 |
| $Fe_5C_2$ (%) | 0 | 76 | 66 | 10 | 86 | 93.6 |
| free carbon (%) | 11 | 8 | 9 | 11 | 8 | 6.3 |
| sheet characteristics | | | | | | |
| Hc(Oe) | 1520 | 990 | 1008 | 1287 | — | — |
| saturation flux density (G) | 4950 | 3370 | 3430 | 4505 | — | — |
| square ratio | 0.86 | 0.70 | 0.70 | 0.72 | — | — |
| SFD | 0.45 | 0.81 | 0.80 | 0.79 | — | — |

(Industrial Applicability)

The present acicular fine particles are suitable in magnetic characteristics for use in audio metal tapes and are decreased in particle size to afford tapes of reduced surface roughness and lower noise level, and therefore are useful for a magnetic coating composition and magnetic recording medium.

What is claimed is:

1. Acicular fine particles having mean particle sizes, in their long axis, of 0.1 to 0.5 μm, and an average axial ratio of 3 to 15;

wherein said particles comprise 15 to 80 weight percent metallic iron, 10 to 75 weight percent iron carbide, and 5–13 weight percent free carbon; and wherein said particles have been made by reducing a starting material, comprising iron carbide, by effective contact with a reducing gas comprising a ratio of hydrogen to a reduction control agent of 1:0.004 to 1:0.0005.

2. Acicular fine particles as defined in claim 1 wherein the reduction control agent is at least one compound selected from the group consisting of carbon monoxide, carbon dioxide, methane, methanol, ethanol, formic acid and methyl formate.

3. Acicular fine particles as defined in claim 2 wherein the reduction control agent is at least one compound selected from the group consisting of carbon monoxide and carbon dioxide.

4. Acicular fine particles as defined in claim 1 which are 1000 to 1300 Oe in coercive force, at least 100 emu/g in saturation magnetization and up to 0.6 in SFD of a sheet prepared therefrom.

5. Acicular fine particles as claimed in claim 1 wherein said iron carbide consists essentially of $Fe_5C_2$.

6. A process of making an acicular fine particle, having controlled magnetic properties, which comprises:
contacting a starting material, comprising acicular particles, comprising iron carbide, with a gas mixture of hydrogen and at least one reduction control agent in a ratio of 1:0.004 to 1:0.0005, respectively, under reducing conditions for a time sufficient to convert said starting material to acicular fine particles comprising: 15 to 80 weight percent metallic iron, 10 to 75 weight percent iron carbide, and 5 to 13 weight percent free carbon.

7. A process as defined in claim 6 wherein the reduction control agent is at least one compound selected from the group consisting of carbon monoxide, carbon dioxide, methane, methanol, ethanol, formic acid and methyl formate.

8. A process as defined in claim 7 wherein the reduction control agent is at least one compound selected from the group consisting of carbon monoxide and carbon dioxide.

9. A process as defined in claim 6 wherein the gas mixture is contacted with the starting material at a temperature of 300° to 400° C.

10. A process as defined in claim 6 wherein the acicular fine iron carbide particles are an iron carbide consisting essentially of $Fe_5C_2$.

11. A magnetic coating composition comprising acicular fine particles having mean particle sizes, in their long axis, of 0.1 to 0.5 μm and an average axial ratio of 3 to 15;
wherein said particles comprise 15 to 80 weight percent metallic iron, 10 to 75 weight percent iron carbide, and 5-13 weight percent free carbon; and
wherein said particles have been made by reducing a starting material, comprising iron carbide, by effective contact with a reducing gas comprising hydrogen and a reduction control agent in a ratio of 1:0.004 to 1:0.0005, respectively.

12. A magnetic coating composition as claimed in claim 11 wherein said reduction control agent is at least one compound selected from the group consisting of carbon monoxide, carbon dioxide, methane, methanol, ethanol, formic acid, and methyl formate.

13. A magnetic coating composition as claimed in claim 11 wherein said particles have a coercive force of 1,000 to 1,300 Oe, a saturation magnetism of at least 100 emu/g and an SFD of up to 0.6.

14. A magnetic recording medium comprising acicular fine particles having a mean particle size, in their long axis, of 0.1 to 0.5 μm and an average axial ratio of 3 to 15;
wherein said particles comprise 15 to 80 weight percent metallic iron, 10 to 75 weight percent iron carbide, and 5-13 weight percent free carbon; and
wherein said particles have been made by reducing a starting material, comprising iron carbide, by effective contact with a reducing gas comprising hydrogen and a reduction control agent in a ratio of 1:0.004 to 1:0.0005, respectively.

15. A magnetic recording medium as claimed in claim 14 wherein said reduction control agent is at least one compound selected from the group consisting of carbon monoxide, carbon dioxide, methane, methanol, ethanol, formic acid, and methyl formate.

16. A magnetic recording medium as claimed in claim 14 wherein said particles have a coercive force of 1,000 to 1,300 Oe, a saturation magnetism of at least 100 emu/g and an SFD of up to 0.6.

* * * * *

UNITED STATES PATENT AND TRADEMARK OFFICE
CERTIFICATE OF CORRECTION

PATENT NO. : 5,443,666
DATED : August 22, 1995
INVENTOR(S) : KITAMURA et al.

It is certified that error appears in the above-identified patent and that said Letters Patent is hereby corrected as shown below:

Title Page, [75], after "Ikuo" delete "Kiatamura".

[22], after "PCT Filed" delete "November 20, 1993".

[19], "Kiatamura" should read --Kitamura--.

Signed and Sealed this

Twenty-sixth Day of December, 1995

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,443,666
DATED : August 22, 1995
INVENTOR(S) : Kitamura et al

It is certified that error appears in the above-indentified patent and that said Letters Patent is hereby corrected as shown below:

On the title page, item [75] after "Ikuo" change "Kiatamura" to --Kitamura--.

On the title page, item [22] after "PCT" Filed" change "November 20, 1993" to --January 20, 1993--.

On the title page, item [19] should read --Kitamura--.

This certificate supersedes Certificate of Correction issued December 26, 1995.

Signed and Sealed this

Twenty-third Day of July, 1996

Attest:

BRUCE LEHMAN

*Attesting Officer*    *Commissioner of Patents and Trademarks*